March 1, 1932.  T. H. MAYFIELD  1,847,490
CULTIVATOR ATTACHMENT
Filed Feb. 5, 1931
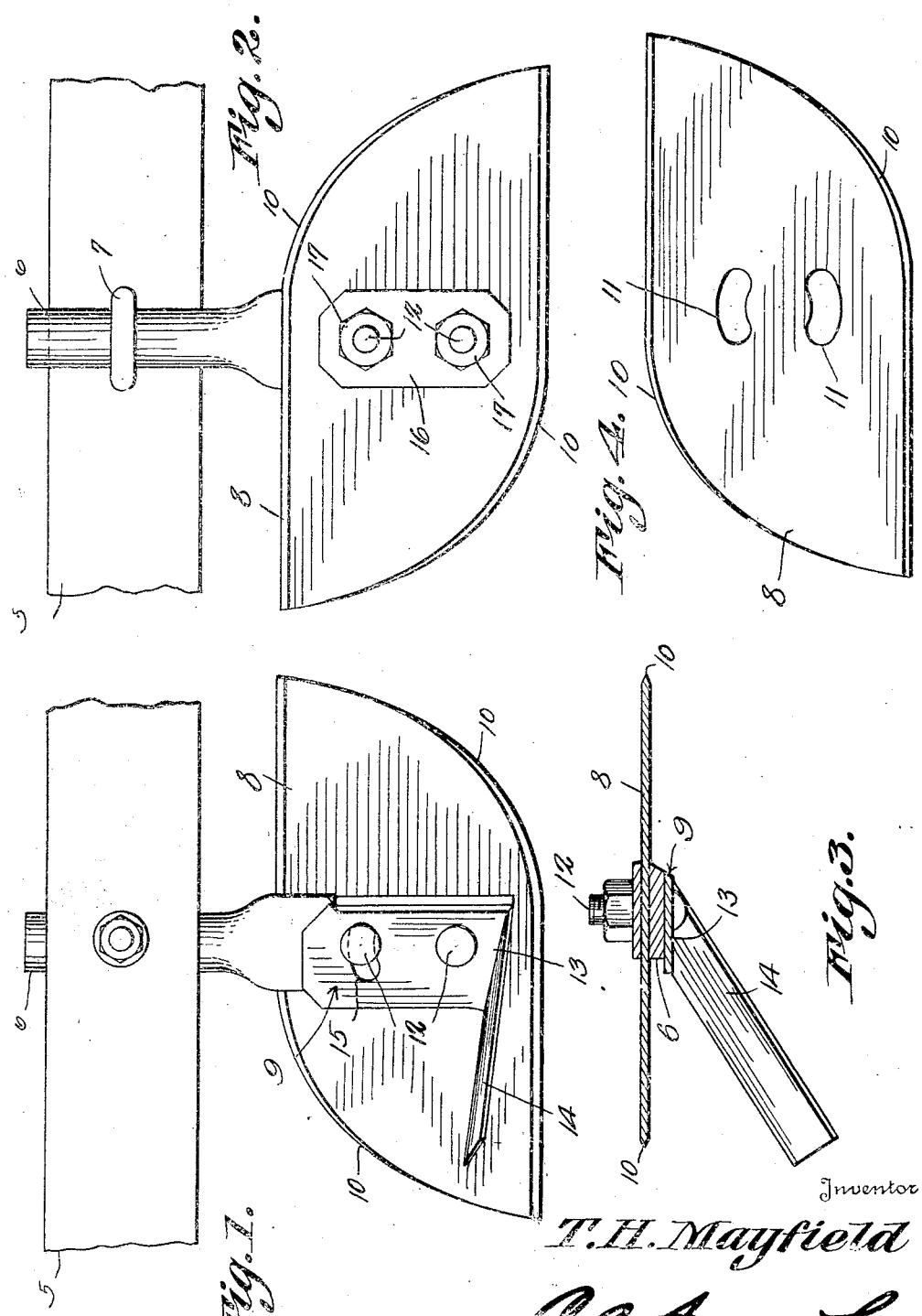
Inventor
T. H. Mayfield Patented Mar. 1, 1932

1,847,490

UNITED STATES PATENT OFFICE

THOMAS H. MAYFIELD, OF ROBY, TEXAS

CULTIVATOR ATTACHMENT

Application filed February 5, 1931. Serial No. 513,714.

This invention relates to cultivator attachments, the primary object of the invention being to provide an adjustable fender and blade, the blade being so constructed that it will cut the weeds and cultivate the soil close to the growing plants, without danger of the soil being thrown onto the plants to injure small plants.

Another object of the invention is to provide a cultivating blade which may be adjusted to various angles, so that the depth of operation of the blade may be varied at the will of the operator.

A still further object of the invention is to provide a fender in the form of a blade, the fender having curved front and rear ends, so that the blade may be readily reversed, the curved ends acting as blades to cut stalks and vines, in the path of travel of the attachment.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is an elevational view of a fender and cultivating blade, constructed in accordance with the invention.

Figure 2 is a side elevational view, illustrating the opposite side of the fender.

Figure 3 is a longitudinal sectional view through the attachment.

Figure 4 is a side elevational view of the fender, illustrating the construction of the openings which permit of adjustment of the fender.

Referring to the drawings in detail, the reference character 5 designates a cultivator beam on which the usual cultivator teeth are mounted. It is of course understood that these beams 5 are arranged in pairs, so that the cultivator teeth may operate on opposite sides of the plants of a row.

The reference character 6 designates a standard which extends through the eye bolt 7 that is mounted on the beam. As shown, the standard is formed with flat side faces at the lower end, one side face of the standard providing a surface against which the fender 8 is supported, while the opposite side face of the standard provides a surface against which the blade 8 is supported.

The front and rear ends 10 of the fender 8 are curved, as clearly shown by Figure 1 of the drawings, the curved edges of the fender being beveled to provide cutting edges, so that the fender will not only operate to guard the blades of the row under cultivation, but will at the same time cut the stalks and vines, directly in the path of travel of the attachment.

Curved openings 11 are formed intermediate the ends of the fender and accommodate the bolts 12 which secure the blade and fender in position on the standard 6, the construction of the openings 11 being such as to permit of adjustment of the fender, to cause it to operate at various depths.

The blade 9, forming an important feature of the invention, embodies a wide shank 13 and a laterally extended cutting blade 14, the blade 14 extending slightly rearward, so that the blade will have a sheering action, as it passes through the soil, to cut the roots of the weeds.

The bolts 12 also act to secure the blade 9 in position, and as shown, the shank 13 of the blade 9 is formed with a curved opening 15 which permits the blade to be tilted on the lower bolt 12, to cause the blade to assume various angles with respect to the ground surface, and consequently regulating the depth of operation of the blade.

In order that the cutting blade and fender will be securely held in their positions of adjustment, an elongated securing plate 16 for positioning over the fender 8 is provided, the plate 16 having openings to receive the bolts 12 on which the nuts 17 are mounted. It will be obvious that when the nuts 17 are securely positioned, a clamping action will set up between the heads of the bolts 12 and the plate 16.

It might be further stated that the front edge of the standard 6, as well as the front edge of the shank 13 of the blade, is beveled to permit the blade to readily pass through the soil.

I claim:

1. In an attachment for cultivators, the combination with a cultivator beam, of a fender having front and rear cutting edges, a standard, means for adjustably connecting the fender to the standard, and a blade extending laterally from the standard at a point intermediate the ends of the fender.

2. In an attachment for cultivators, the combination with a cultivator beam, of a fender having front and rear curved cutting edges, a standard, said fender having curved openings, bolts extending through the standard and curved openings to adjustably mount the fender on the standard, and a blade extending laterally from the standard, said blade including a shank, said bolts passing through the shank of the blade to secure the blade in position on the standard, the front edge of the standard and shank being beveled.

3. In an attachment for cultivators, the combination with a cultivator beam, of a fender having curved front and rear edges beveled to provide cutting edges, a standard, said standard adapted to be secured to a cultivator beam, a blade disposed at a point intermediate the front and rear ends of the fender, and bolts extending through the blade, standard, and fender, to adjustably secure the blade and fender to the standard.

In testimony that I claim the foregoing as my own, I have hereto affixed my signature.

THOMAS H. MAYFIELD.